United States Patent Office 3,305,598
Patented Feb. 21, 1967

3,305,598
THERMAL POLYMERIZATION IN THE PRESENCE OF A HALOGEN
Raymond A. Franz, Kirkwood, and Richard N. Moore, Creve Coeur, Mo., assignors to Monsanto Company, a corporation of Delaware
No Drawing. Filed July 27, 1962, Ser. No. 213,005
12 Claims. (Cl. 260—683.1)

The present invention relates to a process for the polymerization of polymerizable olefin hydrocarbons. More particularly, the present invention relates to a process for the polymerization of polymerizable olefin hydrocarbons under thermal polymerization conditions. Still more particularly, the present invention relates to a process for the polymerization of polymerizable olefin hydrocarbons to relatively low molecular weight polymers in the presence of a "modifying" compound and under specific thermal polymerization conditions.

The polymerization of polymerizable olefin hydrocarbons by noncatalytic means at high temperatures and pressures is well known. Generally, such processes produce large quantities of high molecular weight polymers produced by the condensation of many molecules of the starting polymerizable olefin monomer.

It is an object of the present invention to provide a new and improved process for the polymerization of polymerizable olefin hydrocarbons. Another object of the present invention is to provide a new and improved process for the polymerization of polymerizable olefins under thermal polymerization conditions. Yet, another object of the present invention is to provide a new and improved process for the production of relatively low molecular weight polymers by the polymerization of polymerizable olefin hydrocarbons under thermal polymerization conditions. The particular object of the present invention is to provide a process for the dimerization and trimerization of polymerizable olefin hydrocarbons under thermal polymerization conditions. A specific object of the present invention is to provide a process for the production of dimers and trimers of polymerizable olefin hydrocarbons by polymerization of polymerizable olefin hydrocarbons under high temperature, high pressure polymerization conditions and in the presence of a "modifying" compound. Additional objects will become apparent from the following description of the invention herein disclosed.

The present invention comprises subjecting polymerizable olefin hydrocarbons to thermal polymerization conditions of temperature and pressure in the presence of small amounts of a modifying agent comprising a halogen containing compound wherein the halogen is bromine, chlorine or iodine. It has been found that by subjecting polymerizable olefin hydrocarbons to elevated temperatures and pressures in the presence of small amounts of such halogen containing compounds, substantially increased yields of the lower molecular weight polymers such as dimers and trimers are produced. This increased yield of low molecular weight polymers is obtained while maintaining a relatively high yield of total polymer formed.

The terms "dimer" and "trimer" as used herein in describing the products of the present invention refer to compounds formed by the condensation of two and three molecules or monomer units, respectively, of a particular polymerizable olefin hydrocarbon.

To further describe and to illustrate the present invention, the following examples are presented. These examples are in no way to be construed as limiting the present invention.

*Example I*

Two separate polymerization runs were made using in each run a propylene feed having the composition 97% by weight propylene and 3% by weight propane. Both runs were carried out in a 1.7 liter rocking autoclave. One run was carried out in the presence of 1-bromohexane in an amount equivalent to a weight ratio of 1-bromohexane to propylene of approximately 0.036:1. No modifier compound was used in the other run. The temperature during each run was maintained with the range of 325 to 350° C. Pressures in each run attained a maximum when the reaction reached a temperature of 350° C. and then proceeded to decrease to a minimum final pressure. These pressures were as follows: a maximum of 3900 p.s.i.g. and a minimum of 2300 p.s.i.g. in the run containing no modifying agent and a maximum of 3600 p.s.i.g. and a minimum of 2600 p.s.i.g. in the run modified with the 1-bromohexane The reaction carried out in the presence of 1-bromohexane was stopped after only one hour while the unmodified run was allowed to proceed for approximately three hours After completion of the reaction period in each run, the autoclave was cooled to room temperature and vented to the atmosphere. The liquid product was recovered and the molecular weight distribution determined. The conversion and molecular weight distribution are given in the table below.

|  | Unmodified Run Weight, Percent | Modified Run Weight, Percent |
|---|---|---|
| Conversion to Liquid Product | 42.3 | 34.0 |
| Distribution: | | |
| $C_6$, dimer | 17.9 | 33.3 |
| $C_9$, trimer | 21.2 | 29.1 |
| $C_{12}$, tetramer | 20.0 | 19.0 |
| $C_{15}$, pentamer | 18.9 | 5.5 |
| Residue | 22.0 | 13.1 |

In the above example, the conversion to liquid product in the presence of 1-bromohexane represented a decrease in conversion of approximately 19.1%. However, it should be noted that the reaction period for the run in which 1-bromohexane was used was only one hour as compared to three hours for the run containing no modifying compound. The advantage to be gained from the present invention is aptly illustrated from the increase in the yield of the $C_6$ dimer and $C_9$ trimer in the run carried out in the presence of 1-bromohexane. The total increase in yield of these two polymer products was from 39.1% to 62.4% of the polymer product. This represents a 59.6% increase in the yield of these two preferred polymers when utilizing the present invention. Thus, for a given quantity of monomer, a larger quantity of dimer and trimer are produced by the present invention and in less time than is produced by similar conventional thermal polymerization processes and without a significant loss in total polymer product.

*Example II*

A series of runs were carried out with various halogen containing compounds as modifiers. In each of these runs, approximately 0.84 g. of propylene of the same composition of that used in Example I was charged to a stainless steel tube into which had been placed an amount of a halogen-containing compound equivalent to approximately 1.5 mol percent of the total charge to the tube. The stainless steel tube had a length of 4.3 ml. and an inside diameter of 0.03 inch. This tube was capable of withstanding approximately 5000 p.s.i.g. The tubes were sealed and raised to an elevated temperature. Pressure was not measured in any of these runs, but may be readily calculated from the temperature and quantity of products in the sealed tube. The table below presents the percent conversion, the weight percent dimer in the product, the length of time in which the reaction was carried out and the temperature.

| Modifier | Wt. Percent Conv. of $C_3H_6$ to Liq. Prod. | Wt. Percent Hexenes in Liq. Prod. | ° C. | Min. |
|---|---|---|---|---|
| 2-bromopropane | 18 | 66.6 | 375 | 7.5 |
| 1-bromohexane | 22 | 51.6 | 350 | 30 |
| 1-chloropropane | 13 | 46.0 | 350 | 60 |
| HBr | 44 | 41.9 | 375 | 30 |
| 2-bromopropane | 48 | 41.9 | 350 | 120 |
| Benzyl Bromide | 31 | 41.5 | 350 | 60 |
| 1-bromopropane | 39 | 41.2 | 350 | 60 |
| Bromobenzene | 32 | 31.1 | 350 | 60 |

*Example III*

In order to demonstrate the utility of the present invention as a continuous process, two continuous polymerization runs were carried out under similar conditions using propylene of the composition described in Example I. One run was carried out in the presence of 2-bromopropane as a modifying compound while the other was carried out in the absence of any modifying compound. The following table presents the conditions of the two runs and the results obtained therefrom.

| Conditions | Unmodified | Modified with 2-Brompropane |
|---|---|---|
| Amount of Modifier | None | (¹) |
| Pressure, p.s.i.g. | 3,000 | 3,000 |
| Temperature, ° C. | 450 | 450 |
| LHSV | 12.7 | 36 |
| Average Feed Rate, g./min | 3.4 | 5.6 |

¹ 1 Mol. percent.

| Results | Unmodified | Modified with 2-Bromopropane |
|---|---|---|
| Conversion to Liquid Product, Wt. percent | 26.0 | 16.0 |
| Ratio straight-chain to branched chain | 0.73 | 6.16 |
| Analysis of Product, Wt. percent: | | |
| $C_5$ | 7.6 | None |
| $C_6$ | 25.3 | 72.1 |
| $C_7$, $C_8$ | 11.8 | None |
| $C_9$ | 20.2 | 21.9 |
| $C_{10}$, $C_{11}$ | 11.0 | None |
| $C_{12}$ plus | 24.1 | 6.0 |

The above comparison illustrates the unexpected advantages to be gained from the present invention. It will be noted that the unmodified run produced substantially higher amounts of the higher molecular weight polymers than did the modified run. Of further note, is the fact that the process of the present invention produces block polymers (multiples of the feed olefin) whereas the unmodified run produced polymers of every molecular weight.

As has been previously stated, the primary advantage obtained from the present invention is in the very substantial increase in the yield of low molecular weight polymers, i.e., dimers, in the product. This is very aptly illustrated by the following table which presents a comparison of the $C_6$ dimer yields at various conversion levels obtained by polymerizing propylene with and without the addition of a halogen containing modifying compound. The modifying compound used was iso-propyl bromide.

| Conversion of $C_3H_6$ to Liquid Product, Wt. Percent | Wt. Percent Hexenes in Liquid Product | |
|---|---|---|
| | Modified | Unmodified |
| 45 | 21.0 | 17.8 |
| 35 | 38.5 | 18.2 |
| 25 | 56.0 | 19.4 |
| 15 | 73.5 | 20.8 |
| 10 | 82.5 | 21.5 |

The modifying agents useful in the present invention are compounds in which the halogens chlorine, bromine, iodine or combinations thereof are present. Such a compound may be either an organic or an inorganic compound. In addition to these halogens, such other elements as carbon, hydrogen, sulfur, oxygen or nitrogen may be present in the modifying compound. If the compound is organic, it may be saturated or unsaturated, aliphatic or aromatic, straight-chained, branched-chain or cyclic in structure. Generally, it may be stated that the modifying agents are those compounds which under the conditions of the reaction chamber will decompose or otherwise form the hydrogen halides HBr, HCl and HI. This includes not only those compounds of which bromine, chlorine and iodine are a part, but also the halogen gases $Cl_2$, $Br_2$, and $I_2$. Halogen containing compounds within the scope of the present invention include the following non-limiting examples.

| Column I | Column II | Column III |
|---|---|---|
| 2-bromopropane | Bromobenzene | Chloroethanoic acid. |
| 2-chloropropane | Chlorobenzene | Dibromoethanoic acid. |
| 1-iodopropane | m-Dichlorobenzene | di-Iodoethanoic acid. |
| 1-bromobutane | o-Dichlorobenzene | a-Chloroacetamide. |
| 1-chlorobutane | p-Dichlorobenzene | a-Bromoacetanilide. |
| 2-iodobutane | m-Dibromobenzene | Benzoyl chloride. |
| 1-bromopentane | o-Dibromobenzene | Benzoyl bromide. |
| 2-bromopentane | p-Dibromobenzene | Benzoyl iodide. |
| 3-chloropentane | Iodobenzene | Butanoyl chloride. |
| 2-iodopentane | o-Iodotoluene | Butanoyl bromide. |
| 3-bromohexane | m-Iodotoluene | Butanoyl iodide. |
| 2-bromohexane | p-Iodotoluene | 2-chloro-1,4-benzenediol. |
| 2-iodohexane | o-Chlorotoluene | 2-bromo-1,4-benzenediol. |
| 2-bromo-4-methylhexane. | m-Chlorotoluene | 1-chloro-4-nitronaphthalene. |
| 3-chloroheptane | p-Chlorotoluene | Benzene carbonyl chloride. |
| 3-bromoheptane | o-Bromotoluene | Benzene carbonyl bromide. |
| 2-iodoheptane | m-Bromotoluene | Succinyl chloride. |
| 2-bromo-4-ethylhexane. | p-Bromotoluene | 4-chloroquinoline. |
| 4-bromo octane | 1,3,5 dibromotoluene | Ethanoyl iodide. |
| 3-chloro octane | o-Bromo-chlorobenzene. | Hexanoyl chloride. |
| 2-iodo octane | m-Bromo-chlorobenzene. | Decanoyl chloride. |
| 1-bromononane | p-Bromo-chlorobenzene. | 2-bromoethanol. |
| 2-chlorodecane | 2-bromonaphthalene | 2-chloroethanol. |
| 2-bromodecane | 1-chloronaphthalene | Bis-β-chloroethylether. |
| 2-bromo-6-methyldecane. | 1,3-dichloronaphthalene. | Chloromethoxy methane. |
| 3,3-bromomethyldecane. | 2-bromodiphenyl | Cyclohexylchloride. |
| 4-iodoundecane | 2-chlorodiphenyl | Cyclohexylbromide. |
| 1-bromododecane | 4-chlorodiphenyl | Carbon tetrachloride. |
| Hydrogen chloride | Chlorine gas | 2-chloro-3-hexene. |
| Hydrogen bromide | Bromine gas | 2-bromo-2-pentene. |
| Hydrogen iodide | Iodine gas | 3-bromo-4-octene. |

The halogen containing compounds most useful in the practice of the present invention are those which contain a halogen from the group consisting of bromine, chlorine and iodine and the elements carbon and/or hydrogen. These compounds are the halogen substituted hydrocarbons and hydrogen halides. There is no critical limit to the molecular weight of the modifying compound other than one of practicality in handling. It will generally be somewhat preferred, from a pure practical standpoint, to use those compounds which are normally liquid with those that are normally gaseous being even more preferred. In the practice of the present invention, the preferred compounds are the mono- and di-halogen substituted hydrocarbons of no more than 6 carbon atoms and the hydrogen halides. Though all of the halogens from the group consisting of bromine, chlorine and iodine are operable in the present invention, it is generally preferred to use those compounds containing chlorine and bromine with bromine being preferred over chlorine.

The amount of the modifying compound useful in the present invention is based on the ratio of the hydrogen halide obtainable from decomposition of the modifying compound to the polymerizable olefin hydrocarbons. Generally, the mol ratio betwen the amount of hydrogen halide present and the polymerizable olefin hydrocarbons in the feed will be maintained within the range of 1:10 to 1:500. It is preferred, however, that the mol ratio of hydrogen halide to polymerizable olefin hydrocarbons be maintained within the range of 1:50 to 1:100.

The method whereby the modifying compound is added to the reaction zone is not critical to the present invention and may be carried out in virtually any manner. The only critical feature of this addition is that there be a thorough and intimate contact betwen the polymerizable olefin hydrocarbons and the modifying compound. The modifying compound may be introduced concurrently with the olefin feed or it may be introduced countercurrent or crosscurrent to the flow of the olefin feed. Further, when using liquid or liquefiable modifying compounds they may be dispersed within the reaction chamber either as a liquid bed or dispersed upon heat exchange pellets and the like. The best method whereby the modifying compound is brought into contact with the reaction will, of course as a practical matter, vary with the physical properties of the modifying compound. For example, a gaseous or readily gasified modifying compound would likely be most advantageously introduced concurrent, crosscurrent or countercurrent to the feed stream whereas a more viscous liquid or liquefiable solid might more advantageously be placed within the reaction chamber as a dispersed bed as described above. To find the best method for contacting the modifying compound with the reactants is well within the ability of those skilled in the art and no further description is deemed necessary.

The present polymerization process may be carried out as either a batch operation or a continuous process. The equipment necessary for either type of operation may be any conventional equipment which will withstand the extremely high pressures involved in the present process. The residence time of the reactants within the polymerization zone will generally range from .001 to 240 minutes. However, it is to be preferred that the residence time range from no less than .05 minute to no greater than 120 minutes.

Virtually any polymerizable olefin may be thermally polymerized according to the present invention. Generally, such olefins may contain from 2 to 20 carbon atoms. As used herein the term "olefin" is meant to include not only mono-olefin hydrocarbons, but di-olefins as well. Further, the present invention may be used to effectively polymerize acetylenic hydrocarbons. The preferred use of the present invention is in the polymerization of olefin hydrocarbons containing from 2 to 6 carbon atoms. Non-limiting examples of such hydrocarbons are ethylene, propylene, butylene, pentylene, iso-pentylenes, hexenes, iso-hexenes, butadiene, hexadiene, and iso-hexadienes. The present invention is most useful when used for the thermal polymerization of ethylene, propylene and butylene and mixtures thereof. The polymerizable olefin hydrocarbon feed to the present invention need not be a pure feed stream, but will generally contain no less than 40 mol percent polymerizable olefins. This limitation is primarily one of commercial practicality, however, rather than operability. Impurities which may be tolerated in the feed to the present process may include saturated hydrocarbons such as n and iso-paraffins and the like.

The thermal polymerization of olefin hydrocarbons in the presence of the modifying compounds of the present invention is carried out at elevated temperatures, usually within the range of 250° C. to the cracking temperature of the particular hydrocarbons in the feed. The preferred temperatures for operating the present invention are, however, within the range of from about 300 to 500° C. For polymerizing the preferred feeds of the present invention, temperatures of 325 to 475° C. will generally provide the optimum in yield of dimer product.

The process disclosed herein is operated at elevated pressures, generally at a pressure greater than 200 p.s.i.g. The upper limit for pressures in carrying out the present invention is limited only by the strength of the reaction vessel. Generally, it may be stated that the higher the pressure the better the results of the polymerization reaction. The preferred pressures for operating the present polymerization process will be above 1000 p.s.i.g. The optimum pressures for carrying out the present invention may be generally stated as the minimum pressure which may be obtained by the partial pressures of the reactants within a closed polymerization zone at the particular temperature at which polymerization is being carried out.

The apparatus which may be used in carrying out the present invention may be virtually any design. Of course, it will have to be of such design and materials of construction as to withstand relatively high pressures and temperatures. Its primary requirement is only that it be consistent with good engineering principles.

What is claimed is:

1. A process for the thermal polymerization of polymerizable olefin hydrocarbons which comprises subjecting polymerizable olefin hydrocarbons of 2 to 6 carbon atoms to a temperature of 300 to 500° C., a pressure of no less than 1000 p.s.i.g. in a reaction chamber in the absence of a catalyst and in the presence of a modifying compound selected from the group consisting of HBr, HCl, bromine substituted hydrocarbons, chlorine substituted hydrocarbons and combinations thereof, the modifying compound being present in an amount such as to produce a mole ratio of hydrogen halide to hydrocarbon of 1:10 to 1:500.

2. The process of claim 1 wherein the modifying compound is present in an amount sufficient to produce a mole ratio of hydrogen halide to hydrocarbon of 1:50 to 1:100.

3. The process of claim 1 wherein the temperature is 325 to 475° C.

4. The process of claim 1 wherein the modifying compound is HBr.

5. The process of claim 1 wherein the modifying compound is a bromine substituted hydrocarbon of no more than 6 carbon atoms and selected from the group consisting of mono-bromine substituted hydrocarbons and di-bromine substituted hydrocarbons.

6. The process of claim 5 wherein the modifying compound is a bromobenzene.

7. The process of claim 5 wherein the modifying compound is a bromohexane.

8. The process of claim 5 wherein the modifying compound is iso-propyl bromide.

9. The process of claim 5 wherein the modifying compound is HCl.

10. The process of claim 1 wherein the modifying compound is a chlorine substituted hydrocarbon of no more than 6 carbon atoms and selected from the group consisting of mono-chlorine substituted hydrocarbons and di-chlorine substituted hydrocarbons.

11. The process of claim 10 wherein the modifying compound is a chlorobenzene.

12. The process of claim 10 wherein the modifying compound is a chloropropane.

References Cited by the Examiner

UNITED STATES PATENTS

| | | | |
|---|---|---|---|
| 1,989,425 | 1/1935 | Otto | 260—683.15 |
| 2,055,875 | 9/1936 | Morrell | 260—683.15 |
| 2,181,640 | 11/1939 | Deanesly et al. | 260—683.15 |
| 2,233,951 | 3/1941 | Levine | 260—683.15 |
| 2,440,800 | 5/1948 | Hanford et al. | 260—658 |

(Other references on following page)

UNITED STATES PATENTS

| | | | |
|---|---|---|---|
| 2,453,779 | 11/1948 | Bond et al. | 260—663 |
| 2,563,050 | 8/1951 | Linn | 260—663 |
| 2,681,372 | 6/1954 | Trotter | 260—663 |
| 2,807,656 | 9/1957 | Cherniavsky | 260—663 |
| 2,907,805 | 10/1959 | Bestian et al. | 260—683.15 |
| 3,000,987 | 9/1961 | Wald | 260—673.5 |
| 3,065,242 | 11/1962 | Alderson et al. | 260—663 X |

FOREIGN PATENTS

| | | |
|---|---|---|
| 1,292,607 | 3/1962 | France. |
| 807,149 | 1/1959 | Great Britain. |
| 868,566 | 5/1961 | Great Britain. |
| 915,447 | 1/1963 | Great Britain. |

PAUL M. COUGHLAN, Jr., *Primary Examiner.*

ALPHONSO D. SULLIVAN, *Examiner.*